United States Patent [19]

Laflamme

[11] 4,064,782

[45] Dec. 27, 1977

[54] ELECTRONIC MUSIC DISPLAY DEVICE

[76] Inventor: Daniel Laflamme, 157 Desmarchais Boulevard, Verdun, Quebec, Canada

[21] Appl. No.: 683,860

[22] Filed: May 6, 1976

[51] Int. Cl.[2] ........................ G09B 15/02; G10C 3/12

[52] U.S. Cl. .................................... 84/477 R; 84/445; 84/475

[58] Field of Search ...................... 84/477 R, 470, 445, 84/475

[56] References Cited

U.S. PATENT DOCUMENTS 3,023,659 3/1962 Bode ..................................... 84/445

FOREIGN PATENT DOCUMENTS 831,713 1/1970 Canada .................................. 84/445

428,005 5/1935 United Kingdom .............. 84/477 R

*Primary Examiner*—Stephen J. Tomsky

*Attorney, Agent, or Firm*—W. Charles Kent

[57] ABSTRACT

An electronic digital display device for identifying musical notes comprising a series of manually operable on-off key selector switches, a series of manually operable on-off note selector switches, note indicator means visually associated with the note and key selector switches and an appropriate circuit network. One key selector switch is associated with each desired key and each of the selector switches is exclusively and not simultaneously operable in the "on" position. One note selector switch is associated with each desired note and each of the note selector switches is simultaneously operable with one or more of the other selector switches when in the "on" position. The circuit network has a first portion comprising a plurality of circuit branches, one branch associated with each key selector switch. Each of the circuit branches extends to each of the note selector switches and is exclusively actuated by its associated key selector switch. A second circuit network portion comprises a plurality of circuit branches each of which corresponds to a branch of the first circuit portion at each of the selector switches. Each branch of the second circuit portion extends from each of the note selector switches to the note indicator means. The first and second portions of the circuit network are arranged so that a characteristic visual response is obtained from the note indicator means for each note in a given key. This device speeds up and amplifies the transpositions of notes and chords from one key to another and identifies notes or chords and positions in a given key.

10 Claims, 4 Drawing Figures

ELECTRONIC MUSIC DISPLAY DEVICE

BACKGROUND OF THE INVENTION

This invention relates to a device for identifying musical notes and making transpositions of music. It is an electronic device which speeds up and simplifies the transposition of notes and chords from one key to another, and identifies notes or chords and their positions within a particular key.

In arranging or scoring music for a variety of instruments, it is often necessary to transpose notes or chords from a particular key to different notes in a different key for that particular instrument. For example, an alto sax is scored a major sixth higher than it sounds on the piano so that music requiring a concert middle C in the key of middle C for the alto sax, would be scored A in the key of A.

To assist a musician or composer in carrying out the necessary transpositions, various mechanical or chart devices have been previously devised or recommended. For instance, Canadian Pat. No. 631,993 of Capps, issued Dec. 5, 1961, describes a slide rule type of computer for use in transposing chords of various types and combinations, and also to locate, identify and invert such chords. Similarly, Canadian Pat. No. 773,425 of Gaillard, issued Dec. 12, 1967 describes an apparatus made in the form of discs rotatable with respect to each other for storing, retrieving technical musical data including the positions of chords. Canadian Pat. No. 383,007 of Hunter, issued Aug. 1, 1939 describes and illustrates a musical teaching device comprising a chart with a slide bar shiftable across notation marks on the chart. Again, such a device is useful in transposing music from one key to another. A chart apparatus fitting behind the key board of a musical instrument to assist in finding chords is described and illustrated in Canadian Pat. No. 710,999 of A. J. Weis, issued June 8, 1965.

Very little of an electronic nature has been described in the prior art for assisting in locating or transposing chords. Canadian Pat. No. 831,713 of Schmoyer et al., issued Jan. 13, 1970 describes a teaching device which, upon selection of a key, is activated to provide a visual display indicative of other notes or keys which make up the triad formed from that particular key, and the appropriate bass note. Also of general background interest is Canadian Pat. No. 678,611 of Bode, issued Jan. 21, 1964 which describes an apparatus adapted for use with keyboard instruments which enables the player of the instrument to transpose music to different key signatures.

It is an object of the present invention to provide a small lightweight electronic device to be used in music arranging, composing, teaching, and the like, which permits identification of chords and notes and chord positions in a particular key, and transposition of music from one key to another.

SUMMARY OF THE INVENTION

In accordance with the invention, a digital display device is provided for identifying musical notes. The device comprises a series of manually operable on-off key selector switches, a series of manually operable on-off note selector switches, interval indicator means visually associated with the note and key selector switches and an appropriate circuit network. One key selector switch is associated with each desired key and each of the selector switches is of a type which does not permit simultaneous operation of two or more key selector switches in the "on" position. One note selector switch is associated with each desired note and each of the note selector switches is simultaneously operable with one or more of the other note selector switches when in the "on" position. The circuit network has a first portion comprising a plurality of circuit branches, one branch associated with each key selector switch. Each of the circuit branches extends to each of the note selector switches and is exclusively actuated by its associated key selector switch. A second circuit network portion comprises a plurality of circuit branches each of which corresponds to a branch of the first circuit portion at each of the selector switches. Each branch of the second circuit portion extends from each of the note selector switches to the interval indicator means. The first and second portions of the circuit network are arranged so that a characteristic visual response is obtained from the interval indicator means for each note in a given key. These network portions may preferably be arranged so that the same characteristic visual response is obtained for notes having corresponding musical intervals in each selected key. A key indicator means may be visually associated with each of the key selector switches so that the key for a particular actuated key selector switch is indicated.

In a preferred embodiment of the present invention, key selector switches and circuitry are provided for each of the twelve keys of the chromatic musical series and note selector switches and circuitry are provided for each of the twenty-four notes of two octaves of the chromatic musical series. Interval indicator means are made up of numerical values illuminable to indicate the proper musical interval for a note associated with a particular note selector switch in a particular key associated with a particular key selector switch. For example in the key of C, where C is a selected note, and the third and fifth intervals are indicated on the interval indicator means for notes associated with the relevant note selector switches, the device tells us that we have a major triad in the key of C in the root position. More sophisticated chords and inversions or other positions of such chords will similarly be displayed to one using the device, no matter what key the chords are "calculated" in. There are thousands of possibilities of chords, so the effectiveness and simplicity of the device according to the present invention can be readily appreciated.

Moreover, by ascribing a "value" of each note in each key, this value being related to the "distance" or interval of that note from the root position in that key, a valuable tool is provided which assists in arranging, scoring and teaching music. Once the value of such notes are known it becomes very simple for amateur or professional musicians alike to transpose those notes to notes having similar intervals in different keys.

The device according to the present invention, operating for example with a 9-volt battery, provides fast effortless information of a musical nature in an easily readable format, and in these ways offers clear and distinct advantages over previously known mechanical, slide-rule and chart devices devised to provide some of the functions of applicant's device. It may easily be constructed in as little as pocket-size for ease of carrying.

BRIEF DESCRIPTION OF THE DRAWINGS

Other objects and advantages of the invention will become apparent upon reading the following detailed description and upon referring to the drawings in which.

Similar features have been given similar reference numerals in the drawings.

While the invention will be described in connection with an example embodiment, it will be understood that it is not intended to limit the invention to that embodiment. On the contrary it is intended to cover all alternatives, modifications and equivalents as may be included within the spirit and scope of the invention as defined by the appended claims.

DETAILED DESCRIPTION OF THE INVENTION

Figure 1:
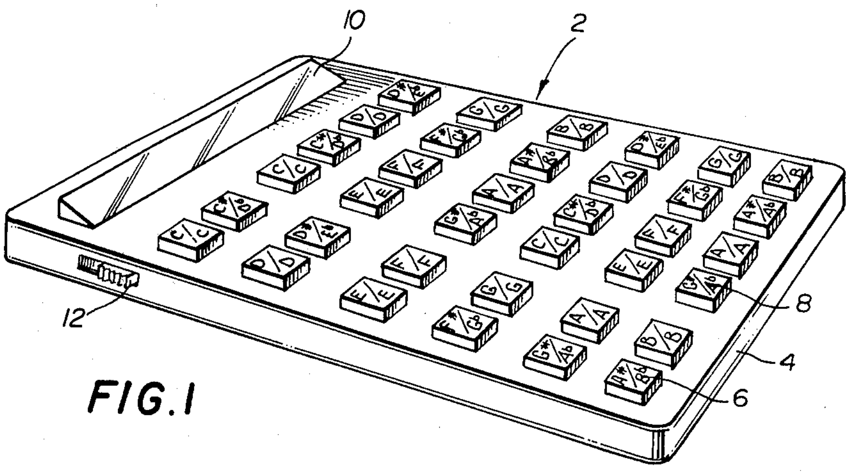
FIG. 1 is a perspective view of an example embodiment of a digital display device according to the invention.
Figure 3:
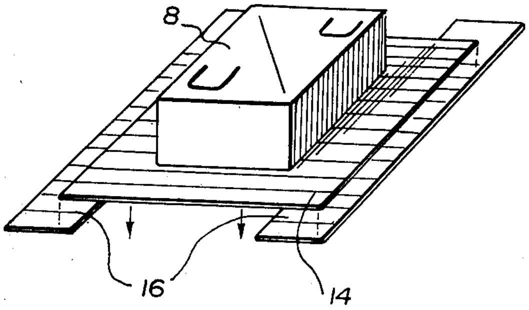
FIG. 3 is an enlarged, schematic view of a note selector switch of a type which may be used according to the present invention.

Turning first to FIG. 1 there is shown a digital display device 2 having frame 4, key selector switches 6, note selector switches 8 and read-out display means 10. Appropriate key and note notations appear respectively on the key selector switches 6 and note selector switches 8. Of the twelve key selector switches, one switch is provided for each of the twelve keys (or enharmonic values thereof) of the chromatic series. A note selector switch for each note over a two octave range of this series is provided to permit inversions of chords or chords which might extend over more than one octave.

The note and key selector switches are push in - push out switches remaining in pushed in or depressed position after being actuated so that the key or note selected can be readily identified. With this end in mind, the switches can of course alternatively be light emitting switches, toggle switches, etc. If a light emitting switch is used, the switch does not stay in a depressed position but instead a light comes on inside the switch to identify the switch which is actuated.

The device illustrated derives its electric power from for example a 9-volt battery (not shown), activated by a main on-off switch 12.

Figure 2:
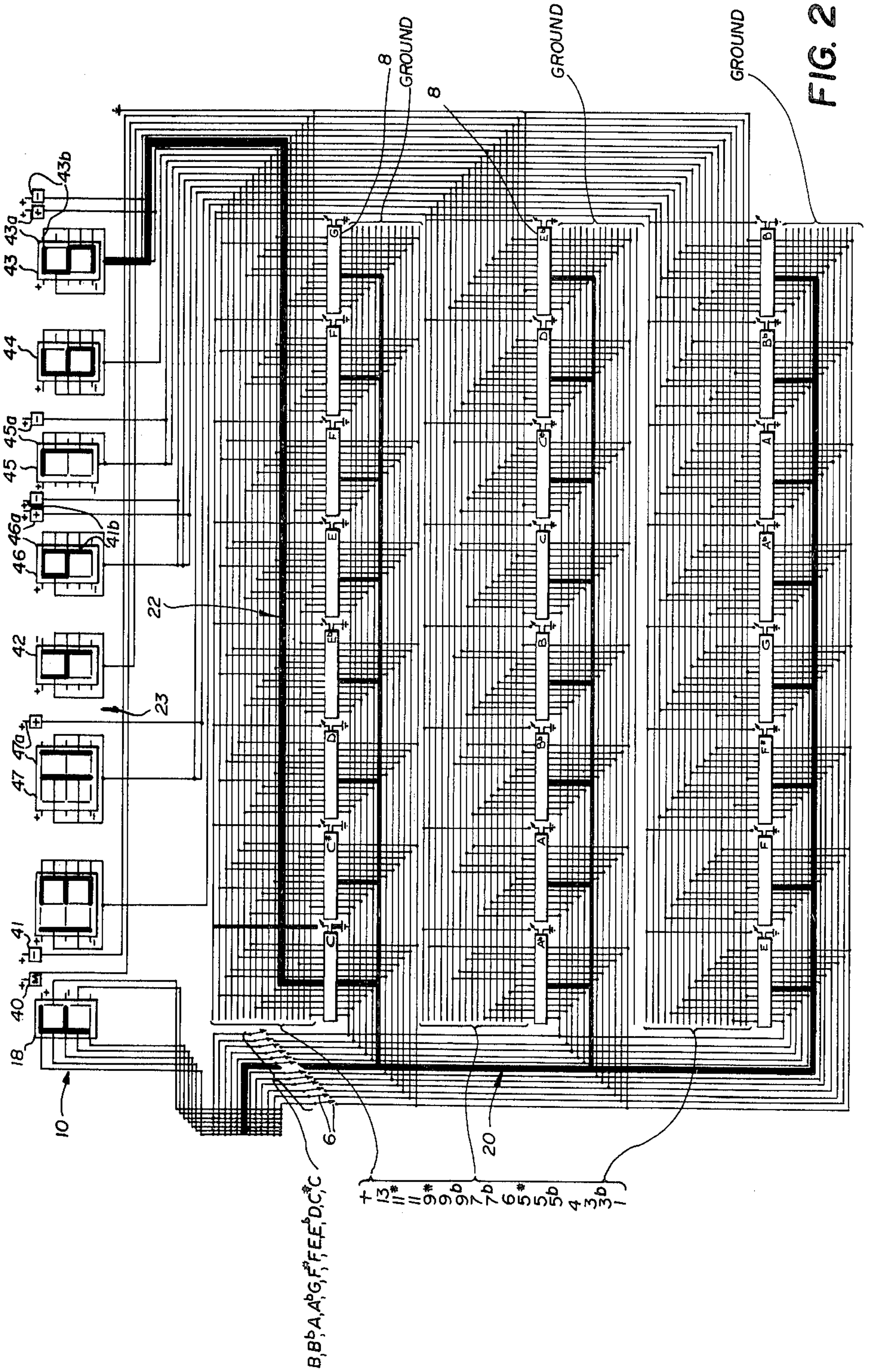
FIG. 2 is an example circuit diagram of a circuit network which may be used in a device according to FIG. 1.

Each of key selector switches 6 as illustrated in the circuit diagram of FIG. 2, when actuated, completes an individual and distinct portion of circuitry (shaded for the key of F in the circuit drawings in question). As a read-out display for only one key at a particular time is useful, the key selector switches must be of a type which does not permit simultaneous operation of two or more key selector switches in an "on" position.

FIG. 1 illustrates a type of push in - push out switch suitable for use as a note selector switch. Twelve contact bridges 14 for twleve pairs of branches having contact points 16 at each switch are provided. When the switch is in "on" or pushed in position, each pair of contact points 16 is joined by a cooperating bridge 14 of the switch.

The circuitry is basically simple, and, as illustrated may require no basic electronic components, (e.g. resistors, capacitors, transistors, etc.) and may be formed from printed circuitry and the like. As illustrated in FIG. 2, a L.E.D. device 18 with appropriate circuitry network may be associated with the main circuitry network to provide a visual indication of the key for an actuated key selector switch. In other words, LED device 18 and its related circuitry are such that device 18 will provide a visual display of the letter of the key selected when one switch is actuated, from A through G.

As illustrated in FIG. 2, when key selector switch 6, for the key of F, is actuated, L.E.D. device 18 shows the letter F, and a first portion 20 of the main circuitry network is actuated with branches leading to each of note selector switches 8 as can be seen by the shaded line. Upon selection of a note (the note of C as shown in this figure), a second portion 22 of the circuitry network, appropriate for the note of C in the key of F, is completed to actuate numeral display unit 23 and show a "5". Circuitry is provided with each of the elements of numeral display unit 23 so that a visual display of the numeral equivalent of the selected note's musical interval value in the selected key, will be given. Thus we know that the note C in the key of F has a value of "5", i.e. it has a musical interval of a fifth in this key. The readout display can be made with either L.E.D.s or stationary numbers.

Figure 4:
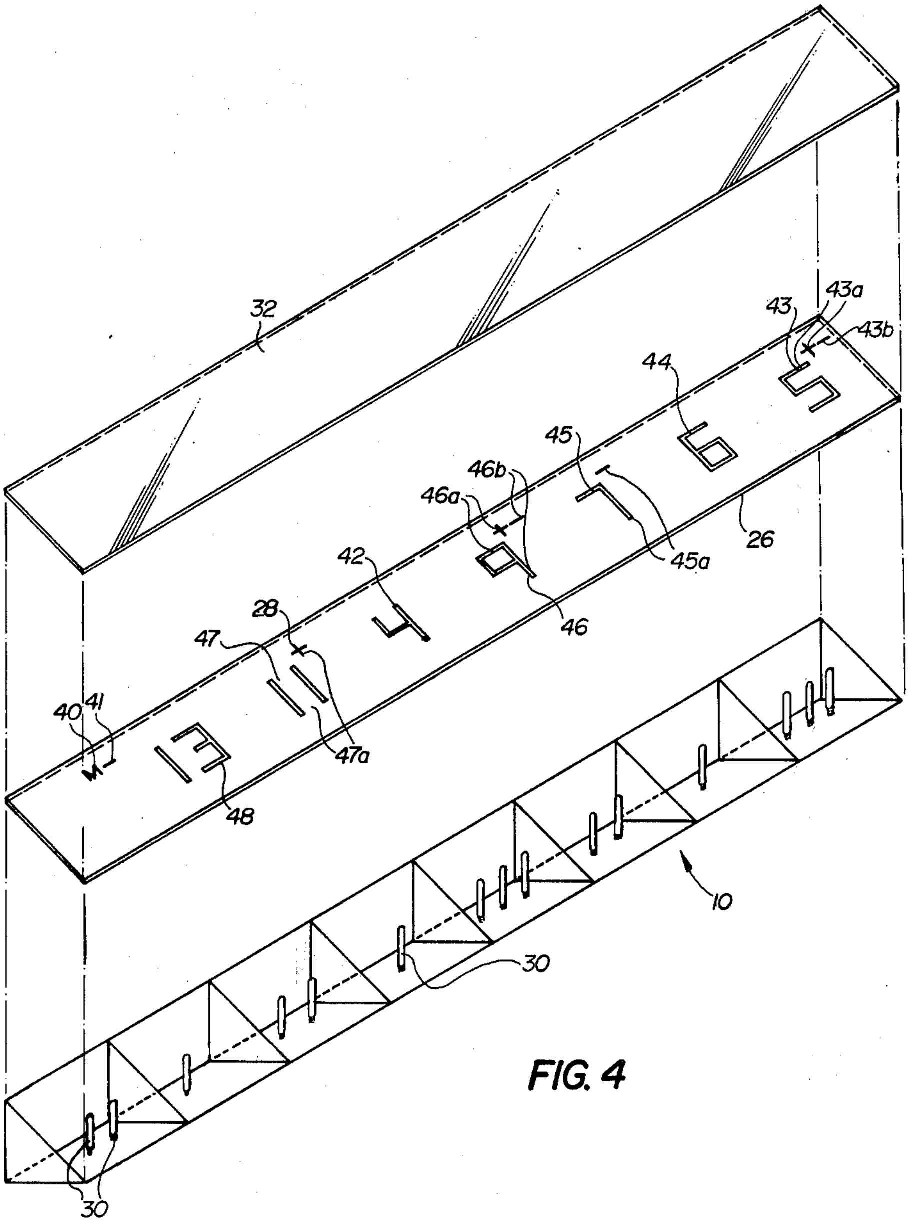
FIG. 4 is an exploded, schematic view of an example note indicator means according to the invention.

An example of a note indicator means construction using stationary numbers not intended to limit the scope of the invention, is illustrated in FIG. 4. A translucent or transparent plastic strip 26 is used, with the relevant numbers or indicia carved therein or otherwise indicated thereon and a suitable light source 30 positioned beneath each indicia to provide appropriate illumination when required. A transparent glass window 32 may protect the plastic strip 26.

The display read-out means 10 illustrated in FIGS. 2 and 4 through the use of indicia including numerals, is set up for identifying notes in a particular key by their standard musical "values" or intervals. This is done as follows:

1. a note appearing in its root position for a particular key is known and does not have to be identified in the read-out means 10 since it will be identified by the key and note selector switches having the same letter or note indication;

2. a major third note appears as the letter M (reference numeral 40) and a minor third note appears as indicia 41;

3. a fourth, fifth and sixth will appear as 4, 5 and 6 (reference numerals 42, 43 and 44 respectively); an augmented fifth and diminished fifth are indicated by 43*a* and 43*b* respectively;

4. a major seventh appears as numeral 7 (reference numeral 45); and a seventh appears as the seven and indicia indicated by reference numeral 45*a;*

5. a note appearing as the ninth is indicated by the numeral 9 (reference numeral 46). An augmented ninth appears as 9+ (reference numeral 46*a*) and a diminished ninth appears as a 9− (reference numeral 46*b*);

6. an eleventh appears as an 11 (reference numeral 47) and an augmented eleventh appears as 11+ (reference numeral 47*a*);

7. a thirteenth appears as a 13 (reference numeral 48); The order of the particular indicia appearing in display area 10 may be as desired.

Examples further illustrating the operation of this device follow:

EXAMPLE 1

Reading Out of Chords in all 12 Keys

If the notes C, E, G are selected on the note selector, for the key of C, the read-out display indicates automatically that we have a C major chord, the numbers relating to a major chord appearing on the read-out display. The same three notes may be transposed and indentified for the remaining eleven keys by merely changing the key selector switch. This may be done no matter how complicated the chord.

Thus for example, if when arranging a musical score for a B♭ clarinet, it is desired to transpose notes and chords arranged in concert key of C to the key of D so that the clarinet may provide accompaniment in the proper pitch, the note selector switches for the relevant keys are actuated to provide the numerical "values" for, or intervals of, the notes in question. Knowing these values, or intervals, then notes in the key of D having the same values, which would be known by a musician or readily obtainable from a chart, are used and arranged on a staff to provide the musical arrangement for the clarinet.

EXAMPLE 2

Reading Out of Chords in all 12 Keys

The device as described and illustrated gives a value to every note in every key. If for example, the note E in the key of C is selected, the display indicator reads out that we have a note which is a major third in the key of C. If the note G is selected, in that key, the device reads out that we have a major fifth. In this way, even someone who knows nothing about chords is able to learn chords and identify them.

EXAMPLE 3

Selection of Poly-Chords

For a particular musical composition, it may be desirable to have two or more chords played together which will give a pleasing sound (for example the right and left hand on the piano, two guitar players in a band, etc.). If for example we take the notes E, G, B and D and actuate the note selector switches for these notes, by choosing the key of C the display read-out gives the numeral references to indicate that a C major ninth chord has been selected. If the key selector switch is then changed to the key of E for these same notes, the numeral references indicate that we have an E minor seventh chord. The educational value of such a feature of this device according to the present invention is apparent, since that instead of learning one chord at a time, a student can learn that a particular combination of notes, being a particular chord in one key, results in a different chord in a different key.

EXAMPLE 4

The Voicing of Chords

Voicing a chord is the art of playing a chord by inverting the notes. For example if we take the key of C, the notes forming the root position of the major triad chord are C, E, G. The first inversion of the chord, starting with the note E, will be indicated by a third appearing on the display device, and the second inversion (G) will be indicated by a fifth. It will be noted from FIG. 1 that the note selector switches are arranged chromatically, left to right in descending series. If three or four note selector switches for notes in a particular key have been depressed, identification of the position or inversion of the chord is achieved by considering first the position of the depressed note selector switches as they appear in this chromatically arranged series, and then compairing that order with the actual order of the notes in the chord being identified. Thus, the position of a chord can be readily determined using the display device for any particular key.

A booklet designed to equate the sequences of numbers appearing on the digital display with particular chords so that a student or other person using the device can readily determine notes and chords for a particular key and transpose such notes and chords to other keys would of course accompany the device. The booklet would also assist in determining the position of inversion of chords.

Thus it is apparent that there has been provided, in accordance with the invention, a digital display device that fully satisfies the objects, aims and advantages set forth above. While the invention has been described in conjunction with the specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim as my invention:

1. An electronic digital display device for identifying musical notes which comprises:

1. a series of manually operable on-off key selector switches, mounted on a portable frame, one key selector switch associated with each desired key and so identified, each said key selector switch being of a type which does not permit simultaneous operation of two or more key selector switches in the "on" position;
2. a series of manually operable on-off note selector switches mounted on the frame, one note selector switch being associated with each desired note and so identified, each said note selector switch being simultaneously operable with any one or more other said note selector switches in the "on" position;
3. interval indicator means mounted on the frame and visually associated with said note and key selector switches;
4. a first circuit network portion comprising a plurality of circuit branches, one branch associated with each key selector switch, each of said circuit branches extending to each of said note selector switches and being exclusively actuated by its associated key selector switch;
5. a second circuit network portion comprising a plurality of circuit branches, each corresponding to a branch of said first circuit portion at each of said note selector switches and each branch of said second circuit portion extending from each of said note selector switches to said interval indicator means, said first and second portions of said circuit network arranged so that a characteristic visual response is obtained from the interval indicator means for each note in a given key.

2. An electronic device according to claim 1, wherein said first and second portions of said network are arranged so that the same characteristic visual response is obtained for notes having corresponding musical intervals in each selected key.

3. A device according to claim 1, wherein said interval indicator means comprise a plurality of numeral values and are illuminally associated with note selector switches in a manner which corresponds to the proper musical interval for a note in a particular key.

4. A device according to claim 1, wherein an exclusive key indicator means is visually associated with each of said key selector switches so that the key for a particular actuated selector switch is indicated.

5. A device according to claim 4, wherein said key indicator unit is a L.E.D. device.

6. A device according to claim 1, wherein said interval indicator means comprise a plurality of L.E.D. devices.

7. A device according to claim 1, wherein said interval indicator means comprise a series of light sources positioned behind a series of cooperating display indicia, the relevant display indicia appearing through a read-out window upon activation of an appropriate light source.

8. A device according to claim 1, wherein said note selector switch comprises a push-pull switch having a plurality of pairs of contacts, one pair for each pair of cooperating branches of said first and second circuit portions at said note selector switches.

9. A device according to claim 1, wherein key selector switches and circuitry are provided for each of the twelve keys of the chromatic musical series.

10. A device according to claim 8, wherein note selector switches and circuitry are provided for 24 notes in two octaves of the chromatic musical series.

* * * * *